(12) United States Patent
Awadalla et al.

(10) Patent No.: US 9,673,911 B2
(45) Date of Patent: Jun. 6, 2017

(54) TRACKING NONLINEAR CROSS-PHASE MODULATION NOISE AND LINEWIDTH INDUCED JITTER IN COHERENT OPTICAL FIBER COMMUNICATION LINKS

(71) Applicant: Infinera Corporation, Sunnyvale, CA (US)

(72) Inventors: Ahmed Awadalla, Gatineau (CA); Kuang-Tsan Wu, Ottawa (CA); Han Sun, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 185 days.

(21) Appl. No.: 14/341,369

(22) Filed: Jul. 25, 2014

(65) Prior Publication Data
US 2015/0333837 A1    Nov. 19, 2015

Related U.S. Application Data

(60) Provisional application No. 61/992,750, filed on May 13, 2014.

(51) Int. Cl.
*H04B 10/61* (2013.01)

(52) U.S. Cl.
CPC ....... *H04B 10/6163* (2013.01); *H04B 10/614* (2013.01); *H04B 10/6162* (2013.01)

(58) Field of Classification Search
CPC .............. H04B 10/614; H04B 10/6162; H04B 10/6163

(Continued)

(56) References Cited

U.S. PATENT DOCUMENTS

| 5,191,462 A * | 3/1993 | Gitlin | H03K 5/088 |
| | | | 398/208 |
| 6,396,586 B1 * | 5/2002 | Wei | H04B 10/2507 |
| | | | 356/479 |

(Continued)

OTHER PUBLICATIONS

R. Dar et al., "Time varying ISI model for nonlinear interference noise", http://arxiv.org/ftp/arxiv/papers/1310.6132.pdf, Oct. 2013, 3 pages.

(Continued)

*Primary Examiner* — Ken N Vanderpuye
*Assistant Examiner* — Dibson Sanchez
(74) *Attorney, Agent, or Firm* — Harrity & Harrity LLP; David L. Soltz

(57) ABSTRACT

An optical receiver may include a digital signal processor to receive an input sample that includes transmitted data, transmitted by an optical transmitter, and nonlinear distortion. The digital signal processor may process the input sample to generate an estimated data value. The estimated data value may be an estimate of the transmitted data. The digital signal processor may remove the estimated data value from the input sample to generate a noise sample. The digital signal processor may determine a nonlinear distortion value based on the input sample, the estimated data value, and the noise sample. The nonlinear distortion value may be an estimate of the nonlinear distortion included in the input sample. The digital signal processor may remove the nonlinear distortion value from the input sample to generate an output sample, and may output the output sample.

20 Claims, 10 Drawing Sheets

(58) Field of Classification Search
USPC .................................................. 398/202–214
See application file for complete search history.

(56) References Cited

U.S. PATENT DOCUMENTS

| | | | | |
|---|---|---|---|---|
| 7,684,712 | B1* | 3/2010 | Roberts | H04B 10/60 375/341 |
| 8,538,279 | B2* | 9/2013 | Li | H04B 10/50 398/152 |
| 8,787,776 | B2* | 7/2014 | Carusone | H04B 10/6971 398/202 |
| 8,849,131 | B2* | 9/2014 | Li | H04B 10/2519 398/147 |
| 2002/0060827 | A1* | 5/2002 | Agazzi | G11B 20/10009 398/158 |
| 2009/0175629 | A1* | 7/2009 | Liu | H04B 10/25133 398/147 |
| 2010/0014873 | A1* | 1/2010 | Bulow | H04B 10/6161 398/159 |
| 2010/0247099 | A1* | 9/2010 | Lowery | H04B 10/2543 398/79 |
| 2011/0097075 | A1* | 4/2011 | Tanimura | H04B 10/07953 398/25 |
| 2011/0135319 | A1* | 6/2011 | Youn | H04B 10/6971 398/202 |
| 2011/0255879 | A1* | 10/2011 | Xie | H04B 10/2513 398/208 |
| 2012/0219303 | A1* | 8/2012 | Li | H04B 10/2543 398/208 |
| 2012/0263464 | A1* | 10/2012 | Koike-Akino | H04B 10/6162 398/65 |
| 2012/0263481 | A1* | 10/2012 | Ip | H04B 10/2543 398/193 |
| 2012/0269507 | A1* | 10/2012 | Renaudier | H04B 10/0795 398/34 |
| 2012/0301146 | A1* | 11/2012 | Mateo | H04B 10/6163 398/65 |
| 2013/0230313 | A1* | 9/2013 | Yan | H04L 25/0202 398/25 |
| 2014/0093255 | A1* | 4/2014 | Liu | H04B 10/6161 398/208 |
| 2014/0099128 | A1* | 4/2014 | Mateo | H04B 10/6163 398/158 |
| 2015/0071630 | A1* | 3/2015 | Oyama | H04B 10/6163 398/25 |
| 2015/0071652 | A1* | 3/2015 | Zhuge | H04B 10/516 398/158 |
| 2015/0372765 | A1* | 12/2015 | Yasuda | H04B 10/613 398/29 |

OTHER PUBLICATIONS

Wikipedia, "Cross-phase modulation", http://en.wikipedia.org/wiki/Cross-phase_modulation, Oct. 4, 2013, 2 pages.
Lei Li et al., "Nonlinear Polarization Crosstalk Canceller for Dual-Polarization Digital Coherent Receivers", Conference on Optical Fiber Communication (OFC), collocated National Fiber Optic Engineers Conference, 2010, 3 pages.

* cited by examiner

TRACKING NONLINEAR CROSS-PHASE MODULATION NOISE AND LINEWIDTH INDUCED JITTER IN COHERENT OPTICAL FIBER COMMUNICATION LINKS

RELATED APPLICATION

This application claims priority under 35 U.S.C. §119 to U.S. Provisional Patent Application No. 61/992,750, filed on May 13, 2014, the content of which is incorporated by reference herein in its entirety.

BACKGROUND

Cross-phase modulation (XPM) is a nonlinear optical effect where one wavelength of light can affect the phase of another wavelength of light. Cross-phase modulation may lead to inter-channel crosstalk in wavelength division multiplexing (WDM) systems, and may produce amplitude and timing jitter.

SUMMARY

According to some possible implementations, an optical receiver may include a digital signal processor configured to receive an input sample that includes transmitted data, transmitted by an optical transmitter, and nonlinear distortion. The digital signal processor may process the input sample to generate an estimated data value. The estimated data value may be an estimate of the transmitted data. The digital signal processor may remove the estimated data value from the input sample to generate a noise sample. The digital signal processor may determine a nonlinear distortion value based on the input sample, the estimated data value, and the noise sample. The nonlinear distortion value may be an estimate of the nonlinear distortion included in the input sample. The digital signal processor may remove the nonlinear distortion value from the input sample to generate an output sample, and may output the output sample.

According to some possible implementations, an optical receiver may include a tracking circuit configured to receive a first input sample, associated with a first polarization, that includes first transmitted data. The tracking circuit may receive a first estimated data value. The first estimated data value may be an estimate of the first transmitted data. The tracking circuit may receive a noise sample generated by removing the first estimated data value from the first input sample. The tracking circuit may receive a second input sample, associated with a second polarization, that includes second transmitted data. The second polarization may be different from the first polarization. The tracking circuit may receive a second estimated data value. The second estimated data value may be an estimate of the second transmitted data. The tracking circuit may determine a nonlinear distortion value based on the first input sample, the first estimated data value, the noise sample, the second input sample, and the second estimated data value. The nonlinear distortion value may be an estimate of nonlinear distortion included in the first input sample. The tracking circuit may output the nonlinear distortion value to correct the first input sample.

According to some possible implementations, a method may include receiving, by a circuit included in an optical receiver, a first input sample that includes first transmitted data. The method may include receiving, by the circuit, a first estimated data value that represents an estimate of the first transmitted data. The method may include receiving, by the circuit, a second input sample that includes second transmitted data. The second input sample may be different from the first input sample. The method may include receiving, by the circuit, a second estimated data value that represents an estimate of the second transmitted data. The method may include receiving, by the circuit, a noise sample. The method may include determining, by the circuit, a nonlinear distortion value based on the first input sample, the first estimated data value, the second input sample, the second estimated data value, and the noise sample. The nonlinear distortion value may represent an estimate of nonlinear distortion included in the first input sample. The method may include outputting, by the circuit, the nonlinear distortion value to correct the first input sample.

DETAILED DESCRIPTION

The following detailed description of example implementations refers to the accompanying drawings. The same reference numbers in different drawings may identify the same or similar elements.

In coherent optical fiber communication links, nonlinear distortion may occur when optical transmission power (e.g., an amount of power used to transmit an optical signal) exceeds a threshold. This nonlinear distortion may be a major source of noise in a signal, and may limit the capacity of an optical channel. Nonlinear distortion (e.g., nonlinear noise) may be modeled as a convolution between a signal and noise. However, nonlinear distortion may be difficult to extract and counteract because the nonlinear distortion appears to be random white noise due to convolution with the signal. Implementations described herein assist in extracting and counteracting nonlinear distortion in optical signals, leading to improved signal quality.

Figure 1:
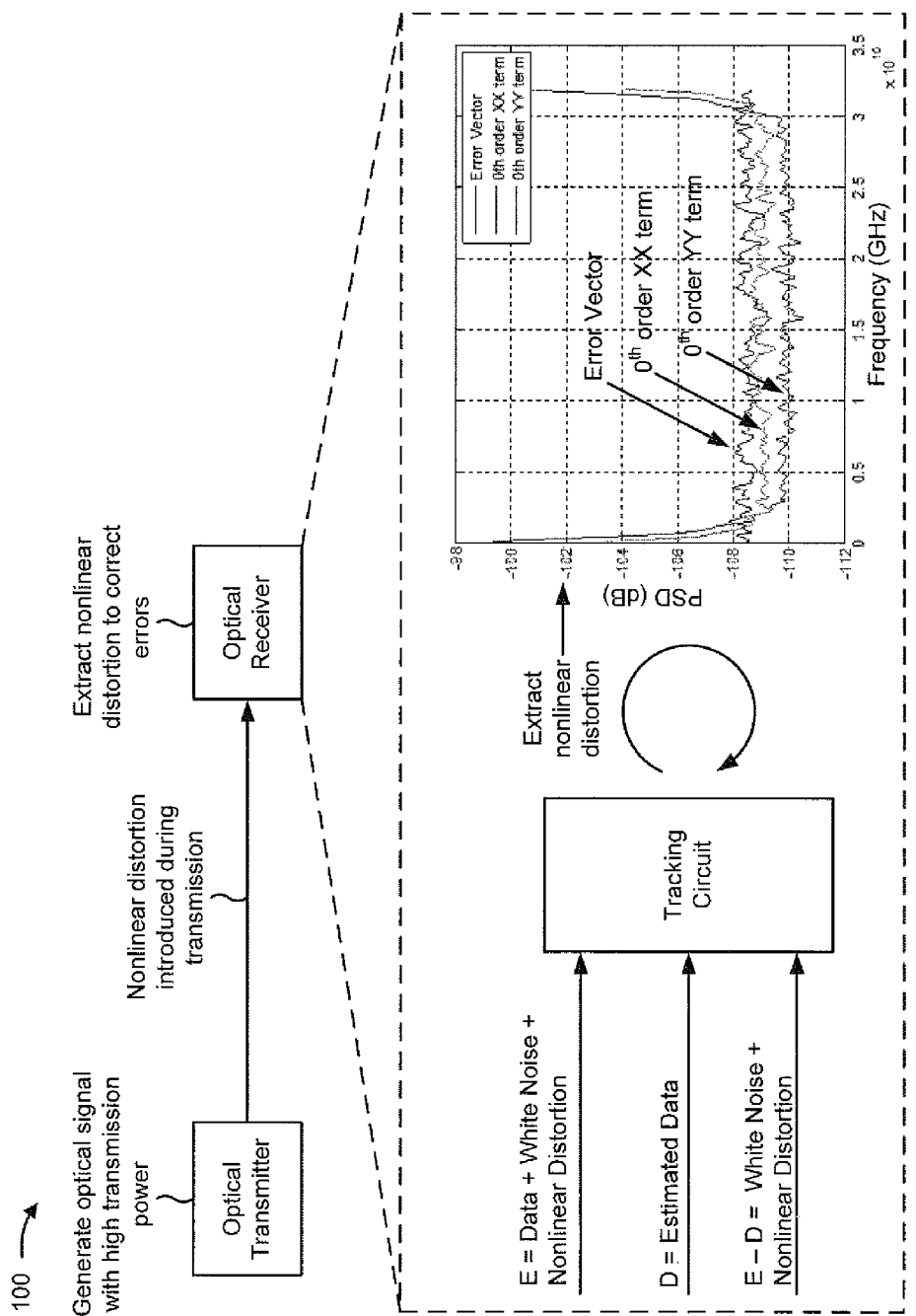
FIG. 1 is a diagram of an overview of an example implementation described herein.

FIG. 1 is a diagram of an overview of an example implementation 100 described herein. As shown in FIG. 1, assume that an optical transmitter generates and transmits an optical signal with a high transmission power (e.g., above a threshold). Due to the high transmission power, assume that nonlinear distortion is introduced in the transmitted optical signal during transmission. Assume that an optical receiver receives the optical signal and extracts the nonlinear distortion from the optical signal to correct errors in the optical signal.

As further shown in FIG. 1, assume that the optical receiver uses a tracking circuit to extract the nonlinear distortion. Assume that the tracking circuit receives, as an example, three inputs. The first input, shown as E, may be a signal that includes transmitted data, white noise, and nonlinear distortion. The second input, shown as D, may be a signal that includes an estimated data value of the transmitted data. The third input, shown as E-D, may be a signal that includes the white noise and the nonlinear distortion (e.g., with the estimated data value removed). Based on these three inputs (and/or other inputs, as described herein), assume that the tracking circuit extracts the nonlinear distortion, as described in more detail elsewhere herein.

For example, in the graph shown in FIG. 1, the Error Vector represents the power spectral density (PSD) of error in a signal. The $0^{th}$ order XX term represents the PSD of (E-D)/D on the X-polarization (e.g., $[E_x(n)-D_x(n)]/D_x(n)$, where n is a sample time), which has a low-pass characteristic. In other words, the $0^{th}$ order XX term represents the term $a_0$ in the equation $E_x(n)-D_x(n)=a_1 \times D_x(n)+a_1 \times D_x(n-1)+a_2 \times D_x(n+1)+noise$. Similarly, the $0^{th}$ order YY term represents the PSD of (E-D)/D on the Y-polarization (e.g., $[E_y(n)-D_y(n)]/D_y(n)$, where n is a sample time), which has a low-pass characteristic. In other words, the $0^{th}$ order YY term represents the term $a_0$ in the equation $E_y(n)-D_y(n)=a_0 \times D_y(n)+a_1 \times D_y(n-1)+a_2 \times D_y(n+1)+noise$. The values of the $0^{th}$ order terms may be extracted from the signal, and may be multiplied with $D_x(n)$ or $E_x(n)$ for the X-polarization (or $D_y(n)$ or $E_y(n)$ for the Y-polarization) as a nonlinear noise term to be subtracted from $E_x(n)$ (or $E_y(n)$) to remove noise from the signal. In this way, the optical receiver may correct for errors introduced by nonlinear distortion, thereby improving signal quality.

Figure 2:
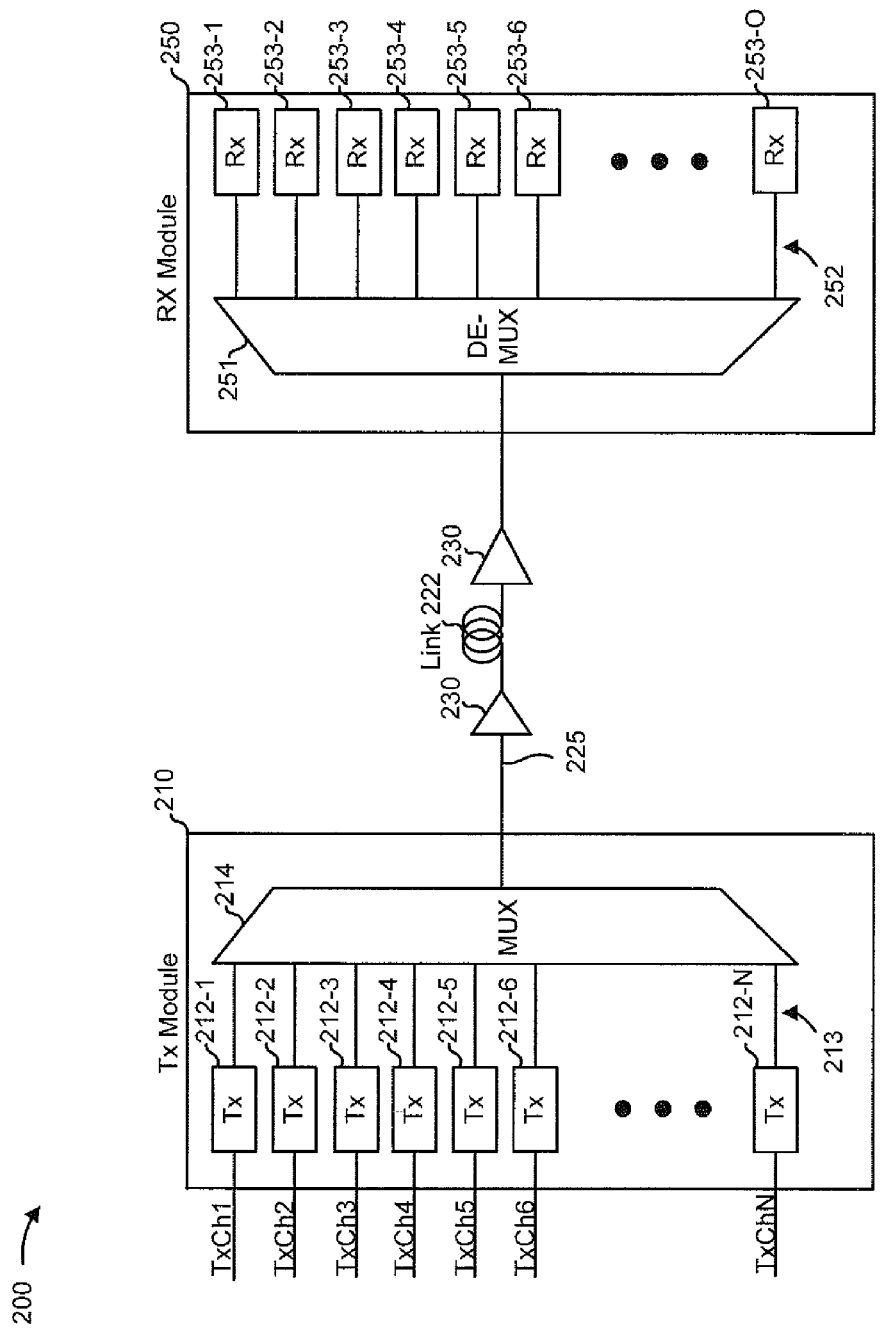
FIG. 2 is a diagram of an example network in which systems and/or methods, described herein, may be implemented.

FIG. 2 is a diagram of an example network 200 in which systems and/or methods, described, herein may be implemented. As shown in FIG. 2, a network may include transmitter module 210 (e.g., a transmitter (Tx) photonic integrated circuit (PIC)) and/or receiver module 250 (e.g., a receiver (Rx) PIC). In some implementations, transmitter module 210 may be optically connected to receiver module 250 via link 222 and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (N≥1), waveguides 213, and/or optical multiplexer 214. Each optical transmitter 212 may receive a data channel (TxCh1 through TxChN), may modulate the data channel with an optical signal, and may transmit the data channel as an optical signal. In some implementations, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

Waveguides 213 may include optical links to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 2, receiver module 250 may include optical demultiplexer 251, waveguides 252, and/or optical receivers 253-1 through 253-O (O≥1). In some implementations, optical demultiplexer 251 may include an AWG or some other demultiplexing device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be made from a birefringent material and/or some other kind of material.

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator, convert the signals to a photocurrent, and provide a voltage output to function as an electrical signal representation of the original input signal.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, or alternatively, one or more of the devices of network 200 may perform one or more functions described as being performed by another one or more of the devices of network 200.

Figure 3:
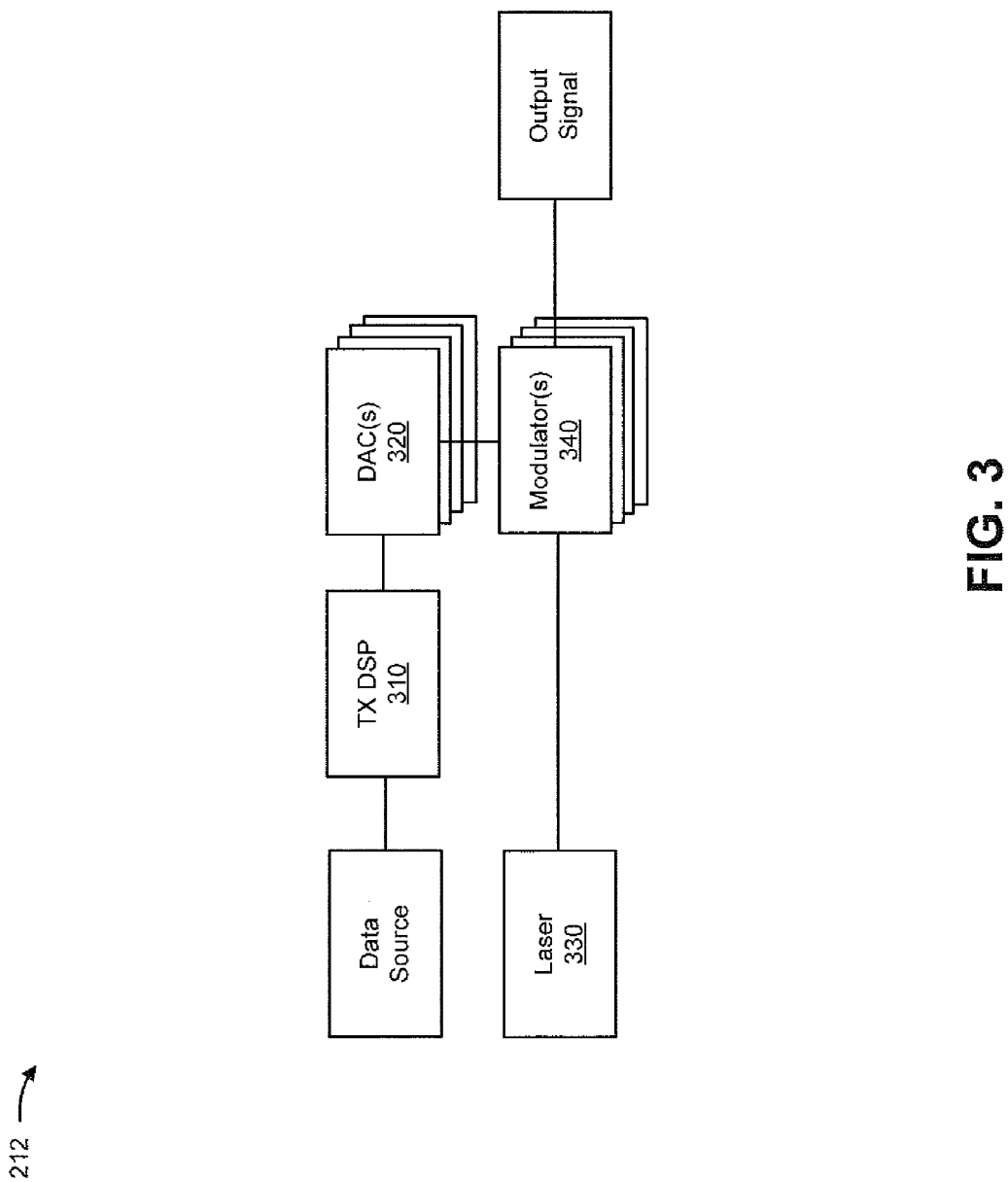
FIG. 3 is a diagram of example components of an optical transmitter shown in FIG. 2.

FIG. 3 is a diagram of example components of optical transmitter 212 shown in network 200 of FIG. 2. As shown in FIG. 3, optical transmitter 212 may include a Tx digital signal processor (DSP) 310, one or more digital-to-analog converters (DACs) 320, a laser 330, and one or more modulators 340. In some implementations, Tx DSP 310, DACs 320, laser 330, and/or modulators 340 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a super-channel transmitter.

Tx DSP 310 may include a digital signal processor or a collection of digital signal processors. In some implementations, Tx DSP 310 may receive a data source (e.g., a signal received via a Tx channel), may process the signal, and may output digital signals having symbols that represent components of the signal (e.g., an in-phase x-polarization component, a quadrature x-polarization component, an in-phase y-polarization component, and a quadrature y-polarization component).

DAC 320 may include a signal converting device or a collection of signal converting devices. In some implementations, DAC 320 may receive respective digital signals from Tx DSP 310, may convert the received digital signals to analog signals, and may provide the analog signals to modulator 340. The analog signals may correspond to electrical signals (e.g., voltage signals) to drive modulator 340. In some implementations, transmitter module 212 may include multiple DACs 320, where a particular DAC 320 may correspond to a particular polarization (e.g., an x-polarization, a y-polarization) of a signal and/or a particular component of a signal (e.g., an in-phase component, a quadrature component).

Laser 330 may include a semiconductor laser, such as a distributed feedback (DFB) laser, or some other type of laser. Laser 330 may provide an output optical light beam to modulator 340.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple sub-carrier output signal, which may be provided to multiplexer 214. Modulator 340 may modulate the optical light beam using a particular modulation format, such as binary phase-shift keying (BPSK), quadrature phase-shift keying (QPSK), differential phase-shift keying (DPSK), etc.

In some implementations, optical transmitter 212 may include multiple modulators 340, which may be used to modulate signals of different polarizations. For example, an optical splitter may receive an optical light beam from laser 330, and may split the optical light beam into two branches: one for a first polarization (e.g., an x-polarization) and one for a second polarization (e.g., the y-polarization). The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of the x-polarization and a quadrature component of the x-polarization), and two DACs 320 may supply voltage signals to the second modulator 340 (e.g., for an in-phase component of the y-polarization and a quadrature component of the y-polarization). The outputs of modulators 340 may be combined back together using combiners (e.g., optical multiplexer 214) and polarization multiplexing.

The number and arrangement of components shown in FIG. 3 is provided as an example. In practice, optical transmitter 212 may include additional components, fewer components, different components, or differently arranged components than those shown in FIG. 3. For example, the quantity of DACs 320, lasers 330, and/or modulators 340 may be selected to implement an optical transmitter 212 that is capable of generating polarization diverse signals for transmission on an optical fiber, such as link 222. Additionally, or alternatively, a set of components shown in FIG. 3 may perform one or more functions described herein as being performed by another set of components shown in FIG. 3.

Figure 4:
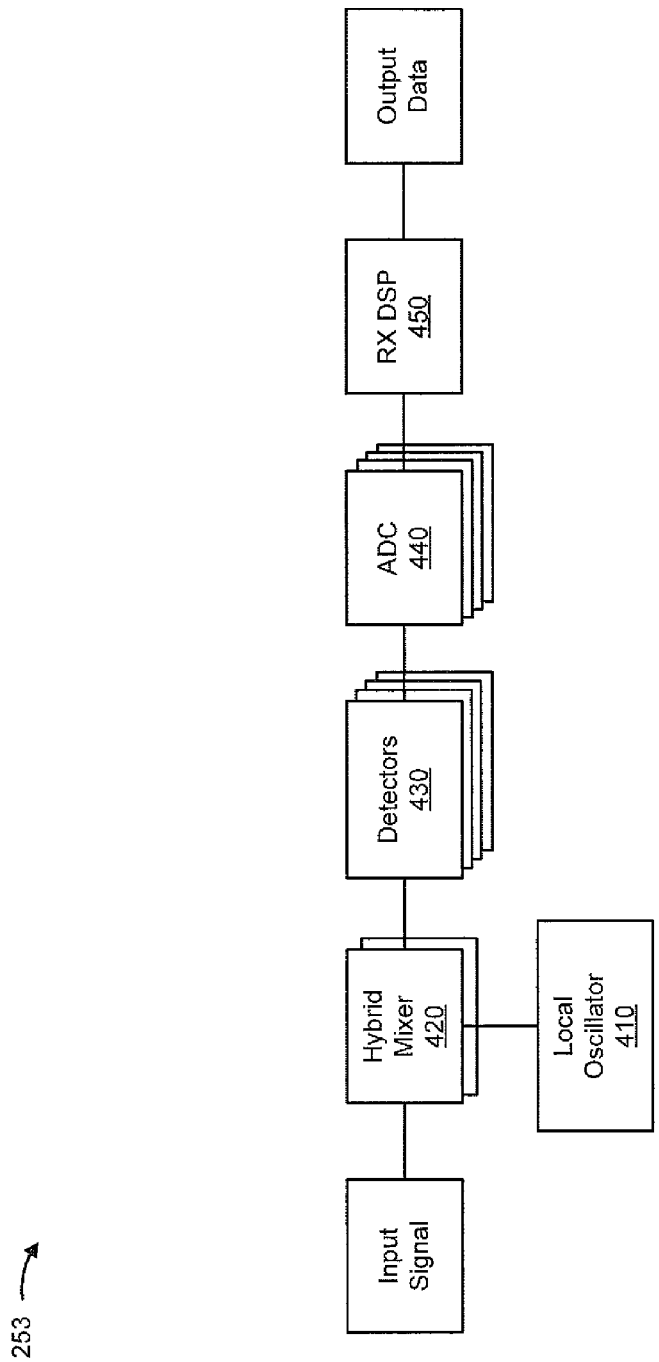
FIG. 4 is a diagram of example components of an optical receiver shown in FIG. 2.

FIG. 4 is a diagram of example components of optical receiver 253 as shown in network 200 of FIG. 2. As shown in FIG. 4, optical receiver 253 may include a local oscillator 410, one or more hybrid mixers 420, one or more detectors 430, one or more analog-to-digital converters (ADCs) 440, and/or an Rx DSP 450. In some implementations, local oscillator 410, hybrid mixer 420, detectors 430, ADCs 440, and/or Rx DSP 450 may be implemented on one or more integrated circuits, such as one or more PICs, one or more ASICs, etc.

Local oscillator 410 may include a laser device. In some implementations, local oscillator 410 may provide a reference signal to hybrid mixer 420. In some implementations, local oscillator 410 may include a single-sided laser to provide an optical signal to hybrid mixer 420. In some other implementations, local oscillator 410 may include a double-sided laser to provide multiple optical signals to multiple hybrid mixers 420. In some implementations, a phase, intensity, and/or amplitude of the reference signal may be compared to a phase, intensity, and/or amplitude of an input signal (e.g., a WDM signal supplied by optical demultiplexer 251 and corresponding to an output signal provided by transmitter module 210) to recover data carried by the input signal.

Hybrid mixer 420 may include one or more optical devices to receive an input signal (e.g., a WDM signal supplied by optical demultiplexer 251 and corresponding to an output signal provided by transmitter module 210). In some implementations, hybrid mixer 420 may receive a reference signal from local oscillator 410. In some implementations, hybrid mixer 420 may supply components associated with the input signal and the reference optical signal to detectors 430. For example, hybrid mixer 420 may supply an in-phase x-polarization (e.g., x-pol) component, a quadrature x-pol component, an in-phase y-polarization (e.g., y-pol) component, and a quadrature y-pol component. In some implementations, a first hybrid mixer 420 may provide the in-phase x-pol component and the quadrature x-pol component, and a second hybrid mixer 420 may provide the in-phase y-pol component and the quadrature y-pol component.

Detector 430 may include one or more photodetectors, such as a photodiode, to receive the output optical signal, from hybrid mixer 420, and convert the output optical signal to corresponding voltage signals. In some implementation, optical receiver 253 may include multiple detectors 430 for in-phase x-pol components, quadrature x-pol components, in-phase y-pol components, and quadrature y-pol components. In some implementations, detectors 430 may include one or more balanced pairs of photodetectors. For example, detectors 430 may include a first pair of photodetectors to receive an in-phase x-pol component, and a second pair of photodetectors to receive a quadrature x-pol component. Additionally, detectors 430 may include a third pair of photodetectors to receive an in-phase y-pol component, and a fourth pair of photodetectors to receive a quadrature y-pol component.

ADC 440 may include an analog-to-digital converter that converts the voltage signals from detector 430 to digital signals. ADC 440 may provide the digital signals to Rx DSP 450. In some implementations, optical receiver 253 may include four ADCs 440 or some other number of ADCs 440 (e.g., one ADC 440 for each electrical signal output by detectors 430).

Rx DSP 450 may include a digital signal processing device or a collection of digital signal processing devices. In some implementations, Rx DSP 450 may receive digital signals from ADCs 440 and may process the digital signals to form output data associated with the input signal received by hybrid mixer 420. Rx DSP 450 may extract nonlinear distortion from a signal to correct the signal, as described in more detail elsewhere herein.

While FIG. 4 shows optical receiver 253 as including a particular quantity and arrangement of components, in some implementations, optical receiver 253 may include additional components, fewer components, different components, or differently arranged components. Additionally, or alternatively, a set of components shown in FIG. 4 may perform one or more functions described herein as being performed by another set of components shown in FIG. 4.

Figure 5:
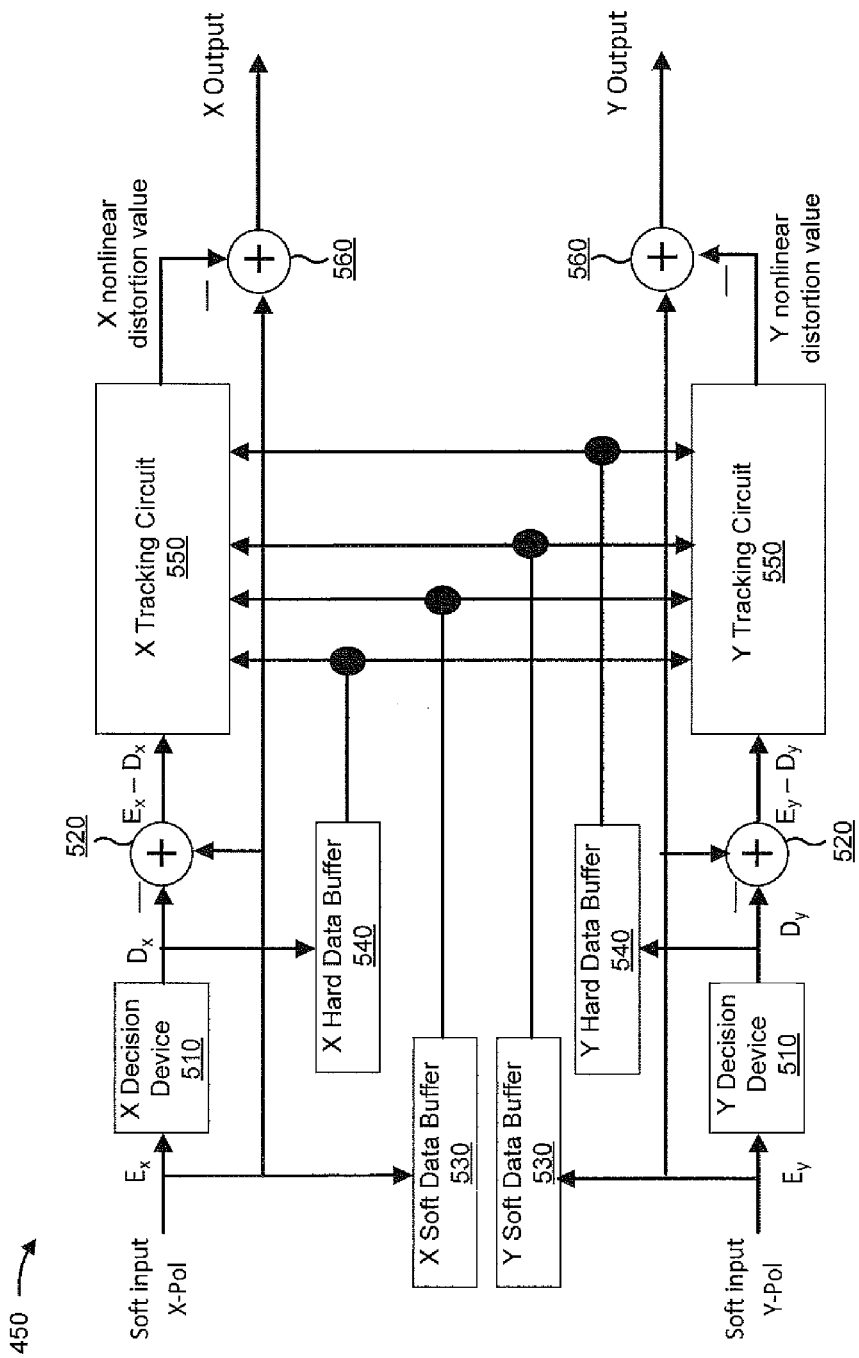
FIG. 5 is a diagram of example components of a receiver digital signal processor shown in FIG. 4.

FIG. 5 is a diagram of example components of Rx DSP 450, shown in FIG. 4. As shown in FIG. 5, Rx DSP 450 may include a decision device 510, a subtraction component 520, a soft data buffer 530, a hard data buffer 540, a tracking circuit 550, and a subtraction component 560. As shown, Rx DSP 450 may include two of each of the above components, one for processing signals on the x-polarization, and one for processing signals on the y-polarization. In some implementations, the functions described with respect to FIG. 5 may be performed at the end of digital signal processing (e.g., after carrier recovery). Additionally, or alternatively, Rx DSP 450 may include components to perform chromatic dispersion (CD) compensation, clock recovery, PMD equalization, and carrier recovery. The functions described with respect to FIG. 5 may be performed after performing these other functions (e.g., after performing CD compensation, clock recovery, PMD equalization, and/or carrier recovery).

As shown, decision device 510 may receive a soft input sample, which may be represented as $E_x$ for the x-polarization and $E_y$ for the y-polarization. A soft input sample may include transmitted data (e.g., a transmitted bit), nonlinear distortion, and white noise. Decision device 510 may use a decision algorithm to estimate a data value of the transmitted data (e.g., a transmitted symbol), and may output the estimated data value of the transmitted data. The estimated data value of the data may be represented by $D_x$ for the x-polarization and $D_y$ for the y-polarization, and may be referred to as an estimated data sample or an estimated data value. The soft input samples may be received at a baud rate associated with Rx DSP 450. In other words, the values of $E_x(n)$ (e.g., at sample time n) and $D_x(n)$ may be represented as follows:

$$E_x(n)=(1+a_0)\times D_x(n)+a_1\times D_x(n-1)+a_2\times D_x(n+1)+\text{noise}$$

$$E_x(n)-D_x(n)=a_0\times D_x(n)+a_1\times D_x(n-1)+a_2\times D_x(n+1)+\text{noise}$$

The values of $E_y(n)$ and $D_y(n)$ may be represented in a similar manner. The values of $a_0$, $a_1$, and $a_2$ may represent time-varying values, and may vary over time at a slow rate (e.g., 100 MHz).

Subtraction component 520 may receive the estimated data value of the data D, and may also receive the soft input sample E. Subtraction component 520 may subtract the estimated data value of the data D from the soft input sample E, and may provide the resulting output (E–D) to tracking circuit 550. For example, for samples on the x-polarization, subtraction component 520 may provide a sample of $E_x-D_x$ to tracking circuit 550, and for samples on the y-polarization, subtraction component 520 may provide a sample of $E_y-D_y$ to tracking circuit 550. The value E–D may represent nonlinear distortion and white noise included in a sample (e.g., as well as any decision error based on an incorrect decision by decision device 510), and may be referred to as a noise sample. By removing the estimated data value D, Rx DSP 450 may create a noise sample with nonlinear distortion that varies at a rate slower than the sampling rate (e.g., the baud rate of Rx DSP 450), thus allowing the nonlinear distortion to be tracked and cancelled.

Tracking circuit 550 may receive the value of E–D for a sample. As further shown, tracking circuit 550 may receive the value of E for the sample, and may receive the value of D for the sample. As shown, the value of E may be stored by soft data buffer 530 before being provided to tracking circuit 550, and the value of D may be stored by hard data buffer 540 before being provided to tracking circuit 550. Soft data buffer 530 and hard data buffer 540 may apply delays to these values before providing these values to tracking circuit 550 to synchronize timing for processing of the values by tracking circuit 550 (e.g., to synchronize processing of E–D, E, and D by tracking circuit 550).

In some implementations, tracking circuit 550 may receive and/or process values of E and D that correspond to a same sample time as E–D. In some implementations, tracking circuit 550 may receive and/or process values of E and D that are associated with a different sample time than E–D. For example, E–D may be associated with a first sample time (e.g., sampled at time n), and E and D may be associated with a second sample time (e.g., sampled at time n−2, n−1, n+1, n+2, etc.).

As further shown, tracking circuit 550 may, when processing a sample of a first polarization (e.g., the x-polarization), receive E and D values associated with a second polarization. For example, when processing samples of the x-polarization, tracking circuit 550 may receive values for $E_x-D_x$, $E_x$, and $D_x$, as described above. Additionally, or alternatively, tracking circuit 550 may receive values for $E_y$ and $D_y$. Tracking circuit 550 may use one or more of these values to extract nonlinear distortion from a sample (e.g., to determine a nonlinear distortion value), as described in more detail elsewhere herein.

As shown, tracking circuit 550 may output the extracted nonlinear distortion value to subtraction component 560. As further shown, subtraction component 560 may receive the nonlinear distortion value, and may also receive the value of E, which represents the original soft input sample that includes the transmitted data, the nonlinear distortion, and white noise. Subtraction component 560 may subtract the nonlinear distortion value from E, and may output the resulting value, which represents the transmitted data plus white noise (e.g., with estimated nonlinear distortion removed). Rx DSP 450 may further process this output to recover the transmitted data.

While FIG. 5 shows Rx DSP 450 as including a particular quantity and arrangement of components, in some implementations, Rx DSP 450 may include additional components, fewer components, different components, or differently arranged components. Additionally, or alternatively, a set of components shown in FIG. 5 may perform one or more functions described herein as being performed by another set of components shown in FIG. 5.

Figure 6:
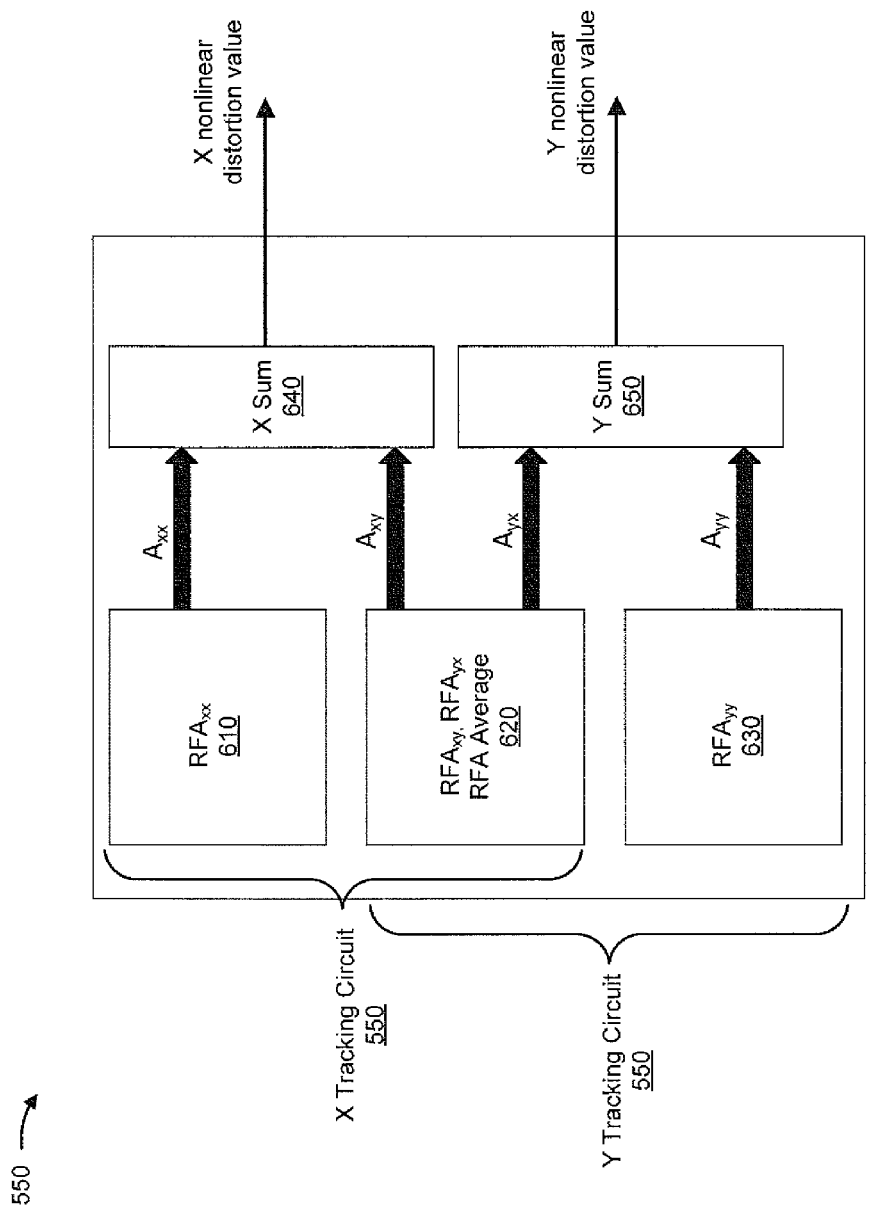
FIGS. 6-9 are diagram of example components of a tracking circuit shown in FIG. 5.

FIG. 6 is a diagram of example components of tracking circuit(s) 550, shown in FIG. 5. As shown in FIG. 6, X tracking circuit 550 may include a remove, filter, and add (RFA) component for noise received on the x-polarization and generated by the x-polarization, shown as $RFA_{xx}$ 610, may include an RFA average component to average noise received on the x-polarization and generated by the y-polarization ($RFA_{xy}$) and noise received on the y-polarization and generated by the x-polarization ($RFA_{yx}$), shown as RFA average 620, and may include an X sum component to sum nonlinear distortion terms received on the x-polarization, shown as X sum 640. As further shown in FIG. 6, Y tracking circuit 550 may include RFA average 620, may include an RFA component for noise received on the y-polarization and generated by the y-polarization, shown as $RFA_{yy}$ 630, and may include a Y sum component to sum nonlinear distortion terms received on the y-polarization, shown as Y sum 650. In some implementations, tracking circuit 550 (e.g., X tracking circuit 550 and/or Y tracking circuit 550) may include $RFA_{xx}$ 610, RFA average 620, $RFA_{yy}$ 630, X sum 640, and Y sum 650.

$RFA_{xx}$ 610 may determine a nonlinear distortion term $A_{xx}$ for noise received on the x-polarization (e.g., the first x in the subscript) and noise generated by the x-polarization (e.g., the second x in the subscript). RFA$_{xx}$ 610 may determine A$_{xx}$ by removing an estimated data value from E$_x$–D$_x$, filtering the result, and adding an X soft input sample to the filtered result. This process is described in more detail elsewhere herein.

RFA average 620 may determine a nonlinear distortion term A$_{xy}$ for noise received on the x-polarization (e.g., the x in the subscript) and noise generated by the y-polarization (e.g., the y in the subscript). The details of this determination are described in more detail elsewhere herein.

X sum component 640 may receive the nonlinear distortion terms A$_{xx}$ and A$_{xy}$, may sum the terms, and may output the sum as the X nonlinear distortion value, which may be input into subtraction component 560, as shown in FIG. 5.

RFA$_{yy}$ 630 may determine a nonlinear distortion term A for noise received on the y-polarization (e.g., the first y in the subscript) and noise generated by the y-polarization (e.g., the second y in the subscript). RFA$_{yy}$ 630 may determine A$_{yy}$ by removing an estimated data value from E$_y$–D$_y$, filtering the result, and adding a Y soft input sample to the filtered result. This process is described in more detail elsewhere herein.

RFA average 620 may determine a nonlinear distortion term A$_{yx}$ for noise received on the y-polarization (e.g., the y in the subscript) and noise generated by the x-polarization (e.g., the x in the subscript). The details of this determination are described in more detail elsewhere herein.

Y sum component 650 may receive the nonlinear distortion terms A$_{yy}$ and A$_{yx}$, may sum the terms, and may output the sum as Y nonlinear distortion value, which may be input into subtraction component 560, as shown in FIG. 5.

While FIG. 6 shows tracking circuit 550 as including a particular quantity and arrangement of components, in some implementations, tracking component 550 may include additional components, fewer components, different components, or differently arranged components. Additionally, or alternatively, a set of components shown in FIG. 6 may perform one or more functions described herein as being performed by another set of components shown in FIG. 6.

Figure 7:
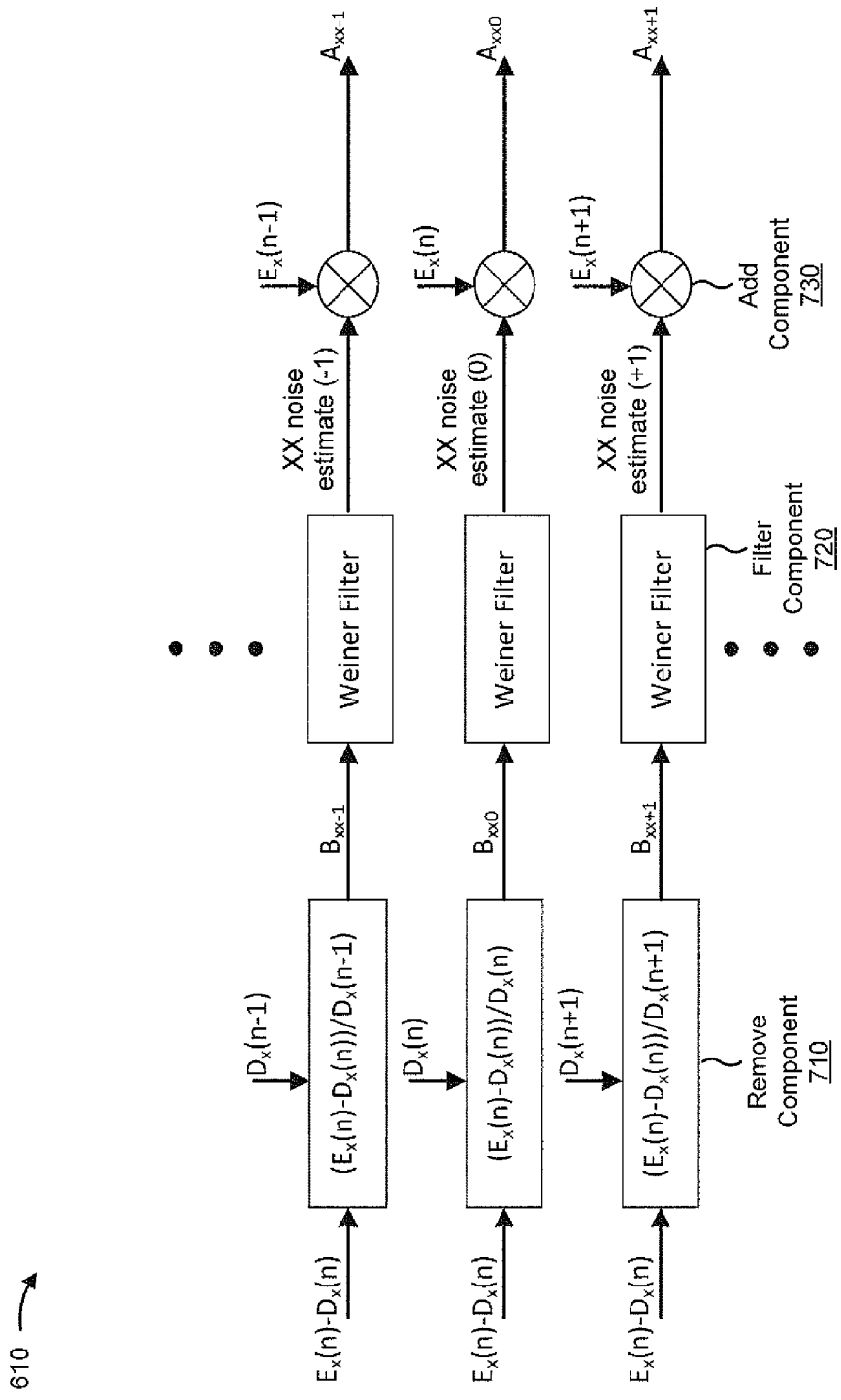

FIG. 7 is a diagram of example components of RFA$_{xx}$ 610, shown in FIG. 6. As shown in FIG. 7, RFA$_{xx}$ 610 may include a remove component 710, a filter component 720, and an add component 730.

As shown in FIG. 7, remove component 710 may receive a sample n of term E$_x$–D$_x$, shown as E$_x$(n)–D$_x$(n). As further shown, remove component 710 may receive a series of samples (e.g., shown as n−1 through n+1) of estimated data value D$_x$. Remove component 710 may remove each received estimated data value D$_x$ from the term E$_x$(n)–D$_x$(n). For example, remove component 710 may remove estimated data value D$_x$, associated with sample time n−1 (e.g., shown as D$_x$(n−1)), from E$_x$(n)–D$_x$(n) by dividing E$_x$(n)–D$_x$(n) by D$_x$(n−1). As shown, in this case, remove component 710 may calculate (E$_x$(n)–D$_x$(n))/D$_x$(n−1). The resulting intermediate value with the removed estimated data value, associated with sample time n−1, may be represented as B$_{xx(-1)}$, as shown. Remove component 710 may remove estimated data values associated with other sample times from E$_x$(n)–D$_x$(n) in a similar manner, as shown.

As further shown in FIG. 7, remove component 710 may provide each intermediate value B$_{xx}$, from which estimated data values associated with different sample times have been removed (e.g., B$_{xx(-1)}$, B$_{xx(0)}$, B$_{xx(+1)}$, etc.), to filter component 720. In some implementations, filter component 720 may include a Weiner filter. Filter component 720 may estimate the noise in sample B$_{xx}$, such as by using a filter that is matched to the power spectral density (PSD) of the noise in the sample. The noise estimate may be an estimate of noise received on the x-polarization and generated by the x-polarization, shown as XX noise estimate. Filter component 720 may provide the XX noise estimate to add component 730.

As shown, add component 730 may combine the XX noise estimate with a soft input sample E$_x$ at the corresponding sample time. For example, add component 730 may combine the XX noise estimate determined based on data term D$_x$(n−1), corresponding to sample time n−1, with soft input sample E$_x$(n−1), also corresponding to sample time n−1. Add component 730 may output the combined XX noise estimate and soft input sample as a nonlinear distortion term A$_{xx}$ at each sample time (e.g., A$_{xx(-1)}$, A$_{xx(0)}$, A$_{xx(+1)}$, etc.). RFA$_{xx}$ 610 may provide the nonlinear distortion term A$_{xx}$ to X Sum 640, as shown in FIG. 6.

Although FIG. 7 shows RFA$_{xx}$ 610, RFA$_{yy}$ 630 may be implemented in a similar manner. For example, in RFA$_{yy}$ 630, remove component 710 may receive E$_y$(n)–D$_y$(n), and may remove estimated data values D$_y$, corresponding to different sample times, to generate intermediate values B$_{yy}$. Further, filter component 720 may filter an intermediate value B$_{yy}$ to determine a noise estimate. The noise estimate may be an estimate of noise received on the y-polarization and generated by the y-polarization (e.g., a YY noise estimate). Add component 730 may combine the YY noise estimate with a soft input sample E$_y$, at the corresponding sample time, to generate a nonlinear distortion term A$_{yy}$. RFA$_{yy}$ 630 may provide the nonlinear distortion term A$_{yy}$ to Y Sum 650, as shown in FIG. 6.

While FIG. 7 shows RFA$_{xx}$ 610 as including a particular quantity and arrangement of components, in some implementations, RFA$_{xx}$ 610 may include additional components, fewer components, different components, or differently arranged components. Additionally, or alternatively, a set of components shown in FIG. 7 may perform one or more functions described herein as being performed by another set of components shown in FIG. 7.

Figure 8A:
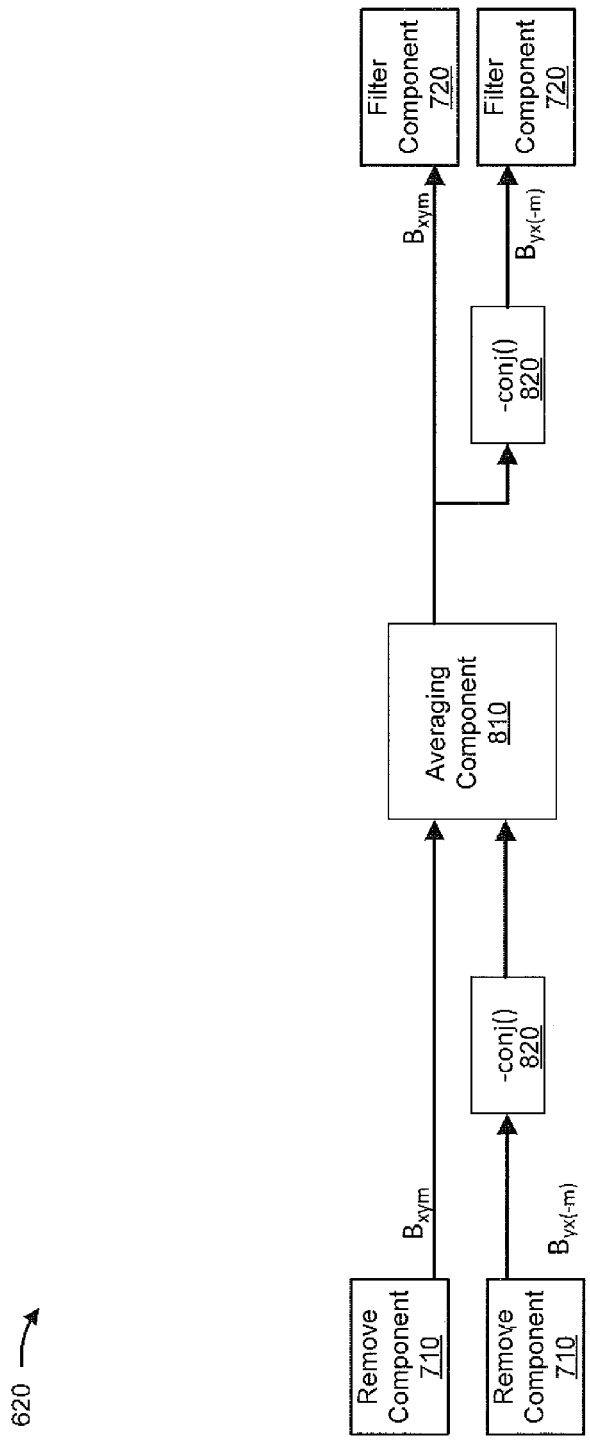
Figure 8B:
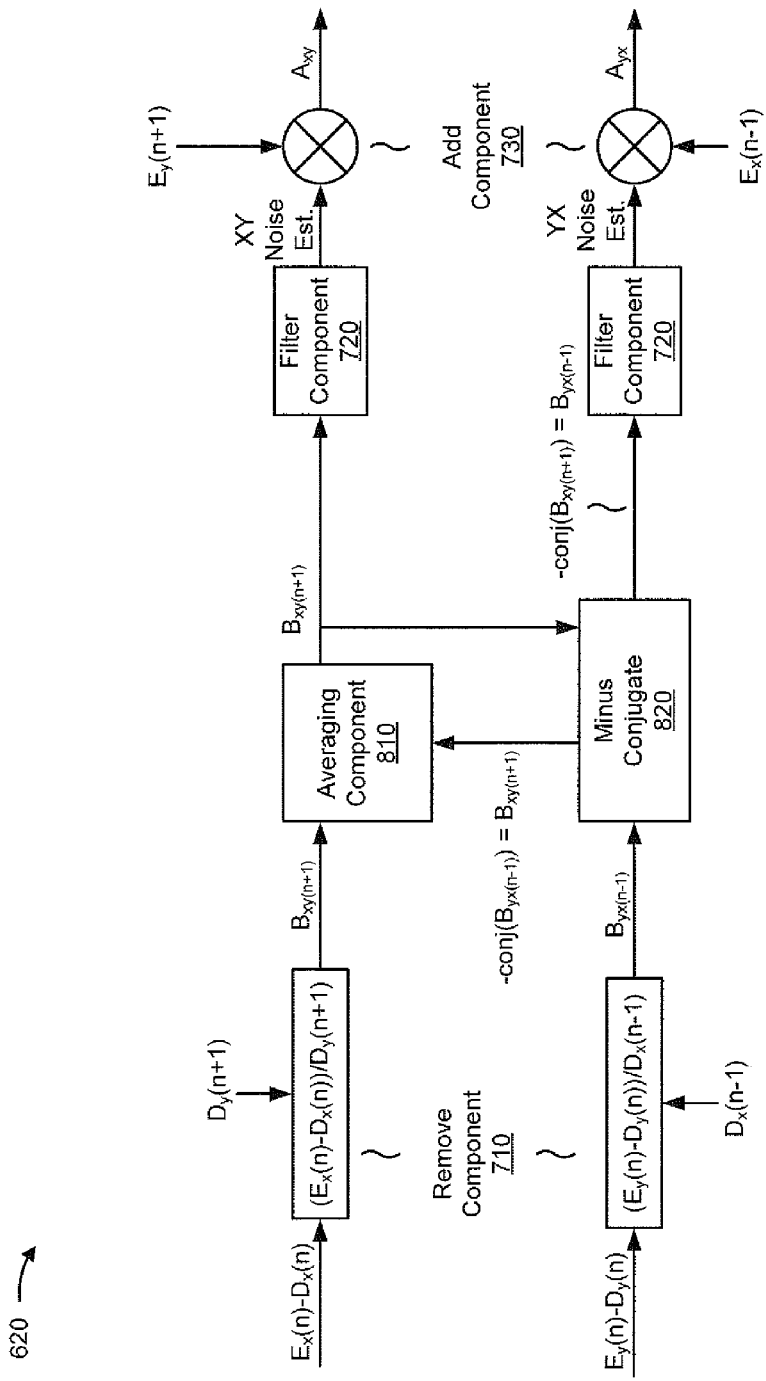

FIGS. 8A and 8B are diagrams of example components of RFA average 620, shown in FIG. 6. As shown in FIG. 8A, RFA average 620 may include a remove component 710, a filter component 720, an averaging component 810, and a minus conjugate component (shown as −conj( )) 820.

In RFA average 620, a first remove component 710 may generate a first intermediate value B$_{xym}$, and a second remove component 710 may generate a second intermediate value B$_{yx(-m)}$. Remove component 710 may generate these terms by receiving a noise sample E−D on a first polarization, and removing an estimated data value D on a second polarization, as described in more detail in connection with FIG. 8B. In the intermediate value representations, the value of m may represent a sample time relative to a particular sample time n. For example, m may represent sample time n+1, −m may represent sample time n−1, etc.

As shown, RFA average 620 may provide B$_{yx(-m)}$ to minus conjugate component 820. Minus conjugate component 820 may generate the minus conjugate of B$_{yx(-m)}$, and may input the minus conjugate value to averaging component 810. Averaging component 810 may also receive the intermediate term B$_{xym}$. Due to a relationship between cross polarization components, the minus conjugate of B$_{yx(-m)}$ is conceptually equal to B$_{xym}$ (e.g., based on the Manakov equations, where nonlinear distortion is a function of total intensity of both the x-polarization and the y-polarization combined). Thus, averaging component 810 may average these two terms (e.g., which may not be equal to one another in practice, due to signal processing errors) to generate a more accurate value for $B_{xym}$ and $B_{yx(-m)}$.

As shown, averaging component 810 may average the two input values to update the value of $B_{xym}$, which may be provided to a first filter component 720. As further shown, the value of $B_{xym}$ may be input to minus conjugate component 820, which may calculate the minus conjugate of $B_{xym}$, which is conceptually equal to $B_{yx(-m)}$. Minus conjugate component 820 may provide the updated term $B_{yx(-m)}$ to a second filter component 720. In this way, RFA average 620 may improve the accuracy of a nonlinear distortion term A that is output by RFA average 620, as shown in FIG. 8B.

FIG. 8B shows an example of implementing the components shown in FIG. 8A. As shown in FIG. 8B, a first remove component 710 may receive a noise sample $E_x$–$D_x$ associated with sample time n, shown as $E_x(n)$–$D_x(n)$. As further shown, the first remove component 710 may remove a sample of estimated data value $D_y$ at sample time n+1, shown as $D_y(n+1)$, from $E_x(n)$–$D_x(n)$ by dividing $E_x(n)$–$D_x(n)$ by $D_y(n+1)$. As shown, in this case, the first remove component 710 may calculate $(E_x(n)$–$D_x(n))/D_y(n+1)$. The resulting intermediate value with the data removed estimated data value, associated with sample time n+1 may be represented as $B_{xy(n+1)}$, as shown. As shown, the first remove component 710 may provide the intermediate value $B_{xy(n+1)}$ to averaging component 810.

As further shown in FIG. 8B, a second remove component 710 may receive a noise sample $E_y$–$D_y$ associated with sample time n, shown as $E_y(n)$–$D_y(n)$. As further shown, the second remove component 710 may remove a sample of estimated data value $D_x$ at sample time n−1, shown as $D_x(n-1)$, from $E_y(n)$–$D_y(n)$ by dividing $E_y(n)$–$D_y(n)$ by $D_x(n-1)$. As shown, in this case, the second remove component 710 may calculate $(E_y(n)$–$D_y(n))/D_x(n-1)$. The resulting intermediate value with the removed estimated data value, associated with sample time n−1, may be represented as $B_{yx(n-1)}$, as shown. As shown, the second remove component 710 may provide the intermediate value $B_{yx(n-1)}$ to minus conjugate component 820.

Minus conjugate component 820 may calculate the minus conjugate of $B_{yx(n-1)}$, which may be conceptually equal to $B_{xy(n+1)}$, as shown. Minus conjugate component 820 may provide the minus conjugate value to averaging component 810. Averaging component 810 may average the two received instances of $B_{xy(n+1)}$ to determine a more accurate value (e.g., averaged over two input values) of $B_{xy(n+1)}$. Averaging component 810 may update the value of $B_{xy(n+1)}$ using the averaged value.

As shown, averaging component 810 may provide the updated intermediate value of $B_{xy(n+1)}$ to a first filter component 720. The first filter component 720 may estimate the noise in intermediate value $B_{xy(n+1)}$. The noise estimate may be an estimate of noise received on the x-polarization and generated by the y-polarization, shown as XY noise estimate. The first filter component 720 may provide the XY noise estimate to a first add component 730. The first add component 730 may combine the XY noise estimate with a soft input sample $E_y(n+1)$, corresponding to the same sample time as estimated data value $D_y$ (e.g., n+1). The first add component 730 may output the combined XY noise estimate and soft input sample as a nonlinear distortion term $A_{xy}$. RFA average 620 may provide the nonlinear distortion term $A_{xy}$ to X Sum 640, as shown in FIG. 6.

As further shown, averaging component 810 may also provide the updated intermediate value of $B_{xy(n+1)}$ to minus conjugate component 820. Minus conjugate component 820 may calculate the minus conjugate of $B_{xy(n+1)}$, which may be conceptually equal to $B_{yx(n-1)}$, as shown. Minus conjugate component 820 may provide this minus conjugate value to a second filter component 720.

The second filter component 720 may estimate the noise in sample $B_{yx(n-1)}$. The noise estimate may be an estimate of noise received on the y-polarization and generated by the x-polarization, shown as YX noise estimate. The second filter component 720 may provide the YX noise estimate to a second add component 730. The second add component 730 may combine the YX noise estimate with a soft input sample $E_x(n-1)$, corresponding to the same sample time as estimated data value $D_x$ (e.g., n−1). The second add component 730 may output the combined YX noise estimate and soft input sample as a nonlinear distortion term $A_{yx}$. RFA average 620 may provide the nonlinear distortion term $A_{yx}$ to Y Sum 650, as shown in FIG. 6.

In some implementations, RFA average 620 may combine filter components 720 into a single filter component 720. For example, RFA average 620 may filter (e.g., using filter component 720) the average value output from averaging component 810, and may divide (e.g., split) the filtered output into two outputs. The first output may be output as $B_{xy(n+1)}$, and the second output may be provided to minus conjugate component 820 to generate $B_{yx(n-1)}$.

In this way, RFA average 620 may increase the signal to noise ratio (e.g., by about 3 dB), and may determine a more accurate value for nonlinear distortion, which may be more accurately cancelled from the soft input sample, as shown in FIG. 5.

While FIGS. 8A and 8B show RFA average 620 as including a particular quantity and arrangement of components, in some implementations, RFA average 620 may include additional components, fewer components, different components, or differently arranged components. Additionally, or alternatively, a set of components shown in FIGS. 8A and/or 8B may perform one or more functions described herein as being performed by another set of components shown in FIGS. 8A and/or 8B.

Figure 9:
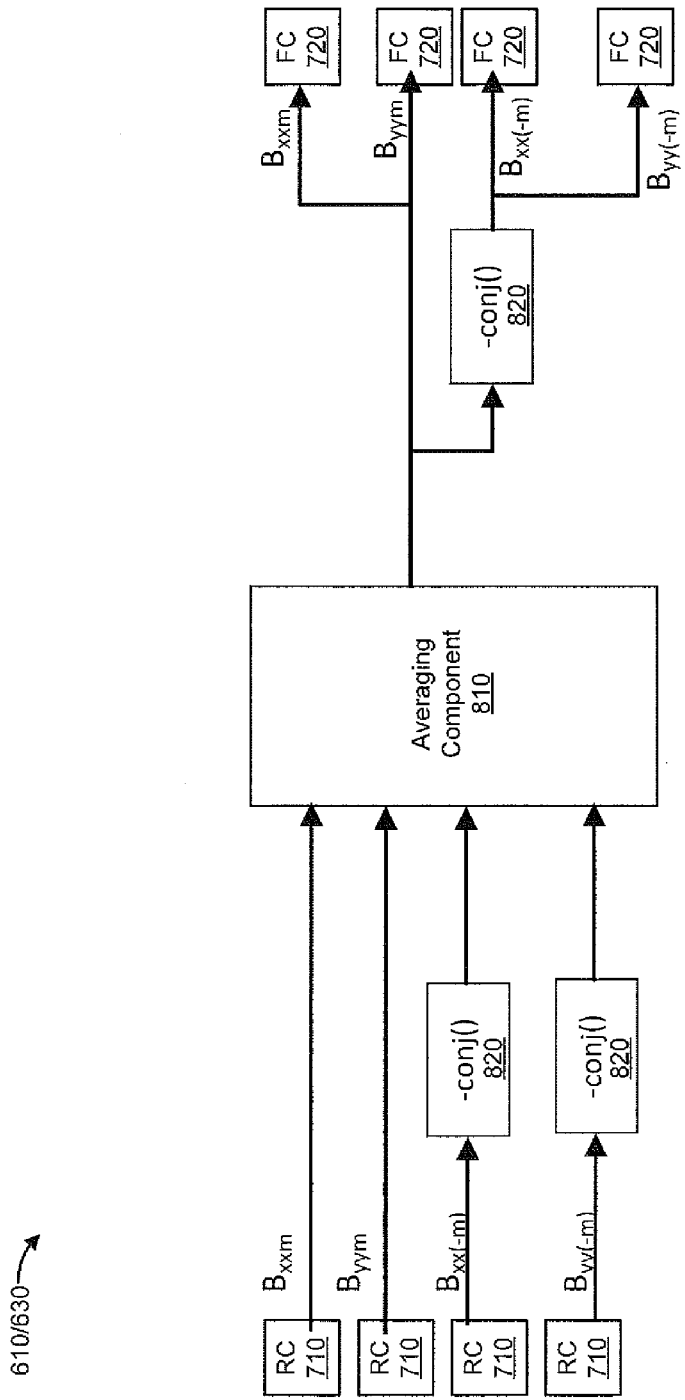

FIG. 9 is a diagram of example components of $RFA_{xx}$ 610 and/or $RFA_{yy}$ 630, shown in FIG. 6. As shown in FIG. 9, $RFA_{xx}$ 610 and/or $RFA_{yy}$ 630 may include a set of remove components (RC) 710, a set of filter components (FC) 720, an averaging component 810, and a set of minus conjugate components 820.

In tracking circuit 550 (e.g., $RFA_{xx}$ 610 and/or $RFA_{yy}$ 630), a first remove component 710 may generate a first intermediate value $B_{xxm}$, a second remove component 710 may generate a second intermediate value $B_{yym}$, a third remove component 710 may generate a third intermediate value $B_{xx(-m)}$, and a fourth remove component 710 may generate a fourth intermediate value $B_{yy(-m)}$. Remove components 710 may generate these intermediate values by receiving an E–D noise sample on a first polarization, and removing an estimated data value D on the first polarization, as described in more detail in connection with FIG. 7.

As shown, tracking circuit 550 may provide $B_{xxm}$ and $B_{yym}$ to averaging component 810. As further shown, tracking circuit 550 may provide $B_{xx(-m)}$ and $B_{yy(-m)}$ to minus conjugate component(s) 820. Minus conjugate component(s) 820 may generate the minus conjugates of $B_{xx(-m)}$ and $B_{yy(-m)}$, and may input these values to averaging component 810. These four values, input to averaging component 810, may be conceptually equal to one another. Thus, averaging component 810 may average these four values (e.g., which may not be equal to one another in practice, due to signal processing errors) to generate a more accurate value for $B_{xxm}$, $B_{yym}$, $B_{xx(-m)}$, and $B_{yy(-m)}$.

As shown, averaging component 810 may average the four input values to update the value of $B_{xxm}$, which may be provided to a first filter component 720, and to update the value of $B_{yym}$, which may be provided to a second filter component 720. As further shown, the averaged output value may be input to minus conjugate component 820, which may calculate the minus conjugate of the averaged output value to generate values for $B_{xx(-m)}$ and $B_{yy(-m)}$. Minus conjugate component 820 may provide the updated term $B_{xx(-m)}$ to a third filter component 720, and may provide the updated intermediate term $B_{yy(-m)}$ to a fourth filter component 720. Filter components 720 may determine noise estimates, and may provide the noise estimates to add component(s) 730 to determine a nonlinear distortion term, as shown in FIG. 7. In this way, tracking circuit 550 may improve the accuracy of nonlinear distortion terms $A_{xx}$ and $A_{yy}$, which may also be used to compensate for high speed jitter noise.

In this way, tracking circuit 550 may increase the signal to noise ratio (e.g., by about 6 dB), and may determine a more accurate value for nonlinear distortion, which may be more accurately cancelled from the soft input sample, as shown in FIG. 5. Furthermore, tracking circuit 550 may compensate for high speed jitter noise due to the beating of the Tx/Rx linewidths and link dispersion.

While FIG. 9 shows RFA$_{xx}$ 610 and/or RFA$_{yy}$ 630 as including a particular quantity and arrangement of components, in some implementations, RFA$_{xx}$ 610 and/or RFA$_{yy}$ 630 may include additional components, fewer components, different components, or differently arranged components. Additionally, or alternatively, a set of components shown in FIG. 9 may perform one or more functions described herein as being performed by another set of components shown in FIG. 9.

Implementations described herein assist in extracting and counteracting noise in optical signals (e.g., nonlinear distortion, jitter, etc.), leading to improved signal quality.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical receiver, comprising:
a digital signal processor configured to:
receive a first input sample that includes first transmitted data, transmitted by an optical transmitter, and nonlinear distortion;
process the first input sample to generate a first estimated data value,
the first estimated data value being an estimate of the first transmitted data;
remove the first estimated data value from the first input sample to generate a noise sample;
receive a second input sample that includes second transmitted data, the second input sample being different from the first input sample;
process the second input sample to generate a second estimated data value, the second estimated data value being an estimate of the second transmitted data;
determine a nonlinear distortion value based on the first input sample, the first estimated data value, the second input sample, the second estimated data value, and the noise sample,
the nonlinear distortion value being an estimate of the nonlinear distortion included in the input sample;
remove the nonlinear distortion value from the input sample to generate an output sample; and
output the output sample.

2. The optical receiver of claim 1, where the digital signal processor, when determining the nonlinear distortion value, is further configured to:
remove the estimated data value from the noise sample to generate an intermediate value;
filter the intermediate value to determine a noise estimate;
combine the noise estimate and the input sample; and
determine the nonlinear distortion value based on combining the noise estimate and the input sample.

3. The optical receiver of claim 1, where the noise sample is associated with a first sample time;
where the first input sample is associated with a first sample time;
where the first estimated data value is associated with the first sample time; and
where the digital signal processor, when determining the nonlinear distortion value, is further configured to:
remove the second estimated data value, associated with a second sample time, from the noise sample to generate an intermediate value,
the second sample time being different from the first sample time;
filter the intermediate value to determine a noise estimate;
combine the noise estimate and the second input sample, the second input sample being associated with the second sample time; and
determine the nonlinear distortion value based on combining the noise estimate and the second input sample.

4. The optical receiver of claim 1, where the noise sample is associated with a first polarization;
where the first input sample is associated with the first polarization;
where the first estimated data value is associated with the first polarization; and
where the digital signal processor, when determining the nonlinear distortion value, is further configured to:
remove the second estimated data value, associated with a second polarization, from the noise sample to generate an intermediate value,
the second polarization being different from the first polarization;
determine a noise estimate based on the intermediate value;
combine the noise estimate and the second input sample, the second input sample being associated with the second polarization; and
determine the nonlinear distortion value based on combining the noise estimate and the second input sample.

5. The optical receiver of claim 1, where the noise sample is associated with a first sample time and a first polarization;
where the first input sample is associated with the first polarization;
where the first estimated data value is associated with the first polarization; and
where the digital signal processor, when determining the nonlinear distortion value, is further configured to:
remove the second estimated data value from the noise sample to generate an intermediate value,
the second estimated data value being associated with a second polarization and a second sample time,
the second polarization being different from the first polarization,
the second sample time being different from the first sample time;
determine a noise estimate based on the intermediate value;
combine the noise estimate and the second input sample, the second input sample being associated with the second polarization and the second sample time; and
determine the nonlinear distortion value based on combining the noise estimate and the second input sample.

6. The optical receiver of claim 1, where the first estimated data value associated with a first sample time; and
where the digital signal processor, when determining the nonlinear distortion value, is further configured to:
remove the first estimated data value from the noise sample to generate a first intermediate value;
remove the second estimated data value, the second estimated data value being associated with a second sample time, from the noise sample to generate a second intermediate value,
the second sample time being different from the first sample time;
calculate a minus conjugate of the second intermediate value to form a minus conjugate value;
determine an average value of at least the first intermediate value and the minus conjugate value; and
determine the nonlinear distortion value based on the average value.

7. The optical receiver of claim 1, where the noise sample is associated with a first polarization;
where the first input sample is associated with the first polarization;
where the first estimated data value is associated with the first polarization; and
where the digital signal processor, when determining the nonlinear distortion value, is further configured to:
receive the second input sample, the second input sample being associated with a second polarization, the second polarization being different from the first polarization;
process the second input sample to generate a second estimated data value associated with the second polarization; and
determine the nonlinear distortion value further based on the second input sample and the second estimated data value.

8. An optical receiver, comprising:
a tracking circuit configured to:
receive a first input sample, associated with a first polarization, that includes first transmitted data;
receive a first estimated data value,
the first estimated data value being an estimate of the first transmitted data;
receive a noise sample generated by removing the first estimated data value from the first input sample;
receive a second input sample, associated with a second polarization, that includes second transmitted data,
the second polarization being different from the first polarization;
receive a second estimated data value,
the second estimated data value being an estimate of the second transmitted data;
determine a nonlinear distortion value based on the first input sample, the first estimated data value, the noise sample, the second input sample, and the second estimated data value,
the nonlinear distortion value being an estimate of nonlinear distortion included in the first input sample; and
output the nonlinear distortion value to correct the first input sample.

9. The optical receiver of claim 8, where the tracking circuit, when determining the nonlinear distortion value, is further configured to:
remove the first estimated data value from the noise sample to generate an intermediate value;
determine a noise estimate based on the intermediate value;
combine the noise estimate and the first input sample; and
determine the nonlinear distortion value based on combining the noise estimate and the first input sample.

10. The optical receiver of claim 8, where the tracking circuit, when determining the nonlinear distortion value, is further configured to:
remove the second estimated data value from the noise sample to generate an intermediate value;
determine a noise estimate based on the intermediate value;
combine the noise estimate and the second input sample; and
determine the nonlinear distortion value based on combining the noise estimate and the second input sample.

11. The optical receiver of claim 8, where the tracking circuit, when determining the nonlinear distortion value, is further configured to:
remove the first estimated data value from the noise sample to generate a first intermediate value;
determine a first noise estimate based on the first intermediate value;

combine the first noise estimate and the first input sample to generate a first nonlinear distortion estimate;
remove the second estimated data value from the noise sample to generate a second intermediate value;
determine a second noise estimate based on the second intermediate value;
combine the second noise estimate and the second input sample to generate a second nonlinear distortion estimate; and
combine the first nonlinear distortion estimate and the second nonlinear distortion estimate to form the nonlinear distortion value.

12. The optical receiver of claim 8, where the noise sample is associated with a first sample time; and
where at least one of:
the first input sample and the first estimated data value are associated with a second sample time that is different from the first sample time, or
the second input sample and the second estimated data value are associated with the second sample time that is different from the first sample time.

13. The optical receiver of claim 8, where the noise sample is a first noise sample associated with the first polarization; and
where the tracking circuit, when determining the nonlinear distortion value, is further configured to:
remove the second estimated data value from the first noise sample to generate a first intermediate value;
remove the first estimated data value from a second noise sample, associated with a second polarization, to generate a second intermediate value,
the second polarization being different from the first polarization;
calculate a minus conjugate of the second intermediate value to form a minus conjugate value;
determine an average value of the first intermediate value and the minus conjugate value;
determine a noise estimate based on the average value;
combine the noise estimate and the second input sample; and
determine the nonlinear distortion value based on combining the noise estimate and the second input sample.

14. The optical receiver of claim 13, where the first noise sample and the second noise sample are associated with a first sample time;
where the first estimated data value is associated with a second sample time that is different from the first sample time; and
where the second estimated data value and the second input sample are associated with a third sample time that is different from the first sample time and the second sample time.

15. A method, comprising:
receiving, by a circuit included in an optical receiver, a first input sample that includes first transmitted data;
receiving, by the circuit, a first estimated data value that represents an estimate of the first transmitted data;
receiving, by the circuit, a second input sample that includes second transmitted data,
the second input sample being different from the first input sample;
receiving, by the circuit, a second estimated data value that represents an estimate of the second transmitted data;
receiving, by the circuit, a noise sample;
determining, by the circuit, a nonlinear distortion value based on the first input sample, the first estimated data value, the second input sample, the second estimated data value, and the noise sample,
the nonlinear distortion value representing an estimate of nonlinear distortion included in the first input sample; and
outputting, by the circuit, the nonlinear distortion value to correct the first input sample.

16. The method of claim 15, where the noise sample is associated with a first sample time; and
where at least one of:
the first input sample and the first estimated data value are associated with a second sample time that is different from the first sample time, or
the second input sample and the second estimated data value are associated with the second sample time that is different from the first sample time.

17. The method of claim 15, where determining the nonlinear distortion value further comprises:
removing the first estimated data value from the noise sample to generate a first intermediate value,
the first estimated data value being associated with a first sample time;
determining a first noise estimate based on the first intermediate value;
combining the first noise estimate and the first input sample to generate a first nonlinear distortion estimate,
the first input sample being associated with the first sample time;
removing the second estimated data value from the noise sample to generate a second intermediate value,
the second estimated data value being associated with a second sample time that is different from the first sample time;
determining a second noise estimate based on the second intermediate value;
combining the second noise estimate and the second input sample to generate a second nonlinear distortion estimate,
the second input sample being associated with the second sample time; and
determining the nonlinear distortion value based on the first nonlinear distortion estimate and the second nonlinear distortion estimate.

18. The method of claim 15, where the noise sample is a first noise sample associated with a first polarization; and
where determining the nonlinear distortion value further comprises:
removing the first estimated data value from the first noise sample to generate a first intermediate value,
the first estimated data value being associated with a second polarization that is different from the first polarization;
removing the second estimated data value from a second noise sample, associated with the second polarization, to generate a second intermediate value,
the second estimated data value being associated with the first polarization;
determining a minus conjugate of the second intermediate value;
averaging the first intermediate value and the minus conjugate of the second intermediate value to form an average intermediate value;
determining a minus conjugate of the average intermediate value;
determining a noise estimate based on the minus conjugate of the average intermediate value;
combining the noise estimate and the first input sample, the first input sample being associated with the first polarization; and determining the nonlinear distortion value based on combining the noise estimate and the first input sample.

19. The method of claim 15, where the noise sample is a first noise sample associated with a first polarization; and where determining the nonlinear distortion value further comprises:

removing the first estimated data value from the first noise sample to generate a first intermediate value, the first estimated data value being associated with a first sample time and the first polarization;

removing the second estimated data value from a second noise sample, associated with a second polarization that is different from the first polarization, to generate a second intermediate value, the second estimated data value being associated with the second polarization and the first sample time;

removing a third estimated data value from the first noise sample to generate a third intermediate value, the third estimated data value being associated with the first polarization and a second sample time that is different from the first sample time;

removing a fourth estimated data value from the second noise sample to generate a fourth intermediate value, the fourth estimated data value being associated with the second polarization and the second sample time;

calculating a first minus conjugate value of the third intermediate value;

calculating a second minus conjugate value of the fourth intermediate value;

determining an average value based on the first intermediate value, the second intermediate value, the first minus conjugate value, and the second minus conjugate value; and determining the nonlinear distortion value based on the average value.

20. The method of claim 15, where the noise sample is associated with a first polarization;

where the first input sample and the first estimated data value are associated with the first polarization; and where the second input sample and the second estimated data value are associated with a second polarization that is different from the first polarization.

* * * * *